United States Patent [19]
Billerbeck et al.

[11] 3,995,068
[45] *Nov. 30, 1976

[54] METHOD OF MAKING SWEETENED STORAGE STABLE PEANUT BUTTER SPREAD AND PRODUCT THEREOF

[76] Inventors: Fred W. Billerbeck; Lawrence H. Everett; Patrick G. McGowan; Paul V. Pettinga, all of Fremont, Mich.

[73] Assignee: Gerber Products Company, Fremont, Mich.

[*] Notice: The portion of the term of this patent subsequent to Sept. 2, 1992, has been disclaimed.

[22] Filed: Aug. 28, 1975

[21] Appl. No.: 608,476

Related U.S. Application Data

[63] Continuation-in-part of Ser. No. 308,369, Nov. 21, 1972, Pat. No. 3,903,311.

[52] U.S. Cl. .............................. 426/324; 426/331; 426/633
[51] Int. Cl.² .......................................... A23L 1/38
[58] Field of Search .......... 426/633, 324, 331, 611, 426/658, 397

[56] References Cited
UNITED STATES PATENTS

| | | | |
|---|---|---|---|
| 1,158,297 | 10/1915 | Root | 426/633 X |
| 1,416,387 | 5/1922 | Sell | 426/633 |
| 1,890,180 | 12/1932 | Hoffman | 426/633 |
| 2,079,288 | 5/1937 | Hoffman | 426/633 |
| 2,397,564 | 4/1946 | Rosenfield et al. | 426/633 |
| 3,044,883 | 7/1962 | Ferguson, Jr. | 426/633 X |
| 3,085,016 | 4/1963 | Merker | 426/633 |
| 3,127,272 | 3/1964 | Baker et al. | 426/633 X |
| 3,216,830 | 11/1965 | Melnick | 426/633 |
| 3,582,358 | 6/1971 | Bundus | 426/633 X |
| 3,615,590 | 10/1971 | Avera et al. | 426/633 |
| 3,619,207 | 11/1971 | Dzurik | 426/633 X |
| 3,749,587 | 7/1973 | Billerbeck et al. | 426/633 |
| 3,903,311 | 9/1975 | Billerbeck et al. | 426/633 X |

*Primary Examiner*—Steven L. Weinstein

[57] ABSTRACT

A peanut butter sweetening agent composition is provided having at least 5 weight percent based on solids of sweetening agent and a long shelf life substantially free of syneresis.

The composition is prepared by combining at an elevated temperature a mixture of milled peanuts, additional edible oils, an emulsifier, and a stabilizer with the sweetening agent having a small amount of edible hydrophilic substance. The resulting mixture may then be fed into containers and the containers sealed.

14 Claims, No Drawings

METHOD OF MAKING SWEETENED STORAGE STABLE PEANUT BUTTER SPREAD AND PRODUCT THEREOF

This is a continuation-in-part application of U.S. Pat. application Ser. No. 308,369, filed Nov. 21, 1972, now U.S. Pat. No. 3.903,311, which issued Sept. 2, 1975.

BACKGROUND OF THE INVENTION

1. Field of the Invention

Peanut spreads or peanut butter find wide use as a staple item of diets. Peanuts are rich in protein, carbohydrates, and oils and therefore provide excellent nutrients. There have been continuing efforts to improve the acceptance of peanut butter, as to its flavor, composition, appearance and characteristics on the palate.

Because of the sweetening effect of honey or other sweetening agents, they provide a desirable additional ingredient. However, significant amounts of these sweetening agents cannot be added without concomitant problems in preparation of the combined composition and in stability on storage. In the past, the addition of large amounts of honey, for example, to peanut butter had lead to a plastic product, which could not be readily agitated and resulted in a product of undesirable texture and color.

Because the various ingredients employed in peanut butters are normally naturally derived, they are complex mixtures of a variety of materials having different physical and chemical properties. For example, peanuts are a combination of vegetable oils which are hydrophobic and lipophilic and proteins and carbohydrates which are hydrophilic and lipophobic. Honey and syrups, which are a combination of saccharides and water, are of course hydrophilic. In addition, the sugars and fats are both independently crystallizable, so that the final product is a complex combination of disparate compounds. Therefore, it is found that care must be taken in combining the various compounds and, frequently, in the materials used, so that the final product is substantially homogeneous and retains this character for long periods of time. Also, during the preparation of the compound, it is essential that the materials remain capable of being mixed to a homogeneous composition.

2. Description of the Prior Art

U.S. Pat. No. 2.079,288 and 1,890,180 teach the combination of relatively high concentrations of honey with peanut butter and a blending oil. U.S. Pat. No. 1,416,387 teaches combining honey and peanut butter. Finally, U.S. Pat. No. 3,044,883 teaches combining small amounts of honey with peanut butter and oils.

SUMMARY OF THE INVENTION

Peanuts, edible oil, emulsifiers, anhydrous hydrophilic substances and stabilizer are thoroughly mixed while the peanuts are milled. The sweetening agent is heated to an elevated temperature such as 120° to 150° F and mixed with the milled peanut composition for a time sufficient to provide substantial homogeneity and then cooled. The resulting product provides a smoothly textured storage stable product.

DESCRIPTION OF THE SPECIFIC EMBODIMENTS

The ingredients employed for the most part in the subject invention are peanut butter, an edible oil, an edible stabilizer, an edible emulsifier, honey and hydrophilic additives. Before considering the process, the various ingredients will be discussed.

The first and major ingredient is the peanut butter which is normally prepared by milling clean (blanched) kernels of roasted peanuts. Various patents have issued describing methods of milling, e.g. U.S. Pat. No. 2,302,574. Peanuts have about 50 weight percent solids, the solids being a combination of protein and carbohydrate. The remaining material is peanut oil. When ground, the peanut oil is pressed out of the solids, so as to have a suspension of small solid particles in peanut oil. This peanut butter product is normally combined with a wide variety of additives to improve texture, taste, appearance and stability prior to being sold commercially.

The edible oil which is added may be a vegetable oil or a partially hydrogenated vegetable oil. These oils include peanut oil, corn oil, cotton seed oil, rice oil, coconut oil, soy bean oil, or other equivalent edible oil.

It has been found particularly advantageous to utilize an emulsifier to stabilize the oil/water system created by the present invention. Polyglycerol esters have been found to be a preferred class of such emulsifiers for this purpose. The basic part of the molecule is glycerol which is water soluble. Several of the glycerol molecules are linked together to form a chain of glycerol molecules. The resulting product is a polyglycerol partial ester of edible fats and/or oils. By choice of fatty acid and placement thereof on the glycerol chain, emulsifiers can be made with a very diverse functionality.

The following polyglycerol esters have been found to be especially effective as emulsifiers in combining peanut butter and honey: decaglycerol tetraoleate, triglycerol monooleate, and decaglycerol tristearate. They are all available commercially from Drew Chemical Corporation, Kingston, Massachusetts, and have been fund to be useful in the range of about 0.15 to 0.85% based on the total weight of honey.

A small amount of a stabilizer is also included. These stabilizers are well known in the art and are for the most part high melting saturated fatty acid glycerides, see for example U.S. Pat. No. 3,671,267, issued June 20, 1972. The glycerides may be mono-, di, or tri glycerides and are primarily derived from hydrogenated vegetable oils or peanut oil. In addition, lecithin may be used either by itself or in combination with the saturated fatty acid glycerides.

The next ingredient is the sweetening agent. An exemplary sweetening agent is honey, which is for the most part an invert sugar. The composition is primarily dextrose (34%) and levulose (41%) with about 2.4% sucrose and enough water to make 100%. However, it is found the water may vary from about 13.4 to 22.9%, with concomitant reduction in the percentage of the other constituents although the ratios of the saccharides remain substantially the same.

Other sweetening agents which may be employed are naturally occurring, naturally derived or synthetic groups. These syrups may be used in place of honey and employed in the subject process in substantially the same manner as the honey. Illustrative sweetening agents include corn syrup, sweetose, liquid sugar, maple syrup, etc. All of these compositions are for the most part aqueous concentrates of sugars, mono- and disaccharides, having less than about 40 weight percent water. The sweetening agents may be used individually or in combination. Preferably, at least 25, more usually at least 50 weight percent of the sweetening agent will be honey.

The mono- and disaccharides include such materials as dextrose (glucose), which may be obtained as cerelose or corn sugar; malto-dextrins, such as Frodex-24, obtained from hydrolysis of corn starch or cereal solids; or sucrose. About half of the mono- and disaccharides may be replaced by partially hydrolyzed starch, such as dextrin, present in the malto-dextrin composition. These sugar compositions are substantially anhydrous, having less than about 5 weight percent water. They also have at least one glucose unit.

The hydrophilic additives which are added to the peanut butter composition are primarily edible materials which will enhance the flavor of the product. Suitable materials are substantially anhydrous monosaccharides, and disaccharides, particularly of 6 carbon sugars. The other hydrophilic additive commonly used will be salt (sodium chloride), which is normally found in commercial peanut butter compositions. It is preferable to use a fine granular structure that is very low in iron and copper minerals. A flour granular salt helps to assure a smooth gritless product.

Other materials which may be included in the final composition are peanut chunks, dieting supplements, etc. The peanut chunks may be used in an amount of from 0 to 20 weight percent of the final composition replacing an equal amount of peanut butter. Also among other materials, anticrystallization agents may be included in the composition. These will normally be present in less than about three weight percent of the final composition and are illustrated by sorbitol, propylene glycol, oxystearin and glycerol.

The amount of peanut butter (solids and peanut oil) which is present in the final composition will generally be from about 60 to 92, more usually from 70 to 90 weight percent of the total composition. The added oil will generally vary from 6 to 24 weight percent, more usually from 10 to 20 percent of the total final composition. The stabilizer would usually be added to provide from 1 to 3 weight percent, more usually from 1.25 to 2.5 weight percent of the total final composition.

The sweetening agent is combined to provided a final concentration of at least 5 weight percent, and not greater than 25 weight percent, more usually from 10 to 22 weight percent based on the entire final composition. The saccharide additive will be added to provide at least about 2.5 weight percent and not more than about 5 weight percent total amount, more usually from about 3–4 weight percent total amount, based on the final composition. The salt is normally added to taste and will be at least about 0.2 and not more than 2, usually from about 0.3 to 1.5 weight percent based on the final composition. The hydrophilic additives should have less than 5 weight percent, usually less than 3 weight percent, and preferably less than about 1 weight percent water when added. This is particularly true of the saccharide additive.

As already indicated, the peanut butter is formed by first combining the dry ingredients, such as roasted peanuts, salt, sweetener, and stabilizer, and thereafter milling the ingredients. Should the emulsifier being utilized be a solid, it is also mixed in with these foregoing dry ingredients. The peanut oil and emulsifier (if liquid), are pre-blended and fed by a metering pump for simultaneous milling with the aforementioned dry ingredients. Particle size reduction of the dry ingredients is thus accomplished as mixing of the ingredients occurs. It has been found that better mixing is achieved in a milling device than would be possible through stirring and recirculation. Among the disadvantages of stirring are that air is more likely to be incorporated with the product. Advantages have been recognized for re-circulating the mixture so as to be subjected to the milling function a second time, even though essentially all of the particle reduction and mixing results from the first milling.

The milled ingredients are discharged from the milling device at a temperature usually in excess of 130° F and more usually at a temperature in the area of 130°–150° F.

Typical of useful milling equipment is a Bauer disctype mill. One disc is stationary and the other revolves in close proximity to it. The ingredients are force fed by a screw feeder to the center of the discs. The milling action on the peanuts and other ingredients is determined by the design of the pattern on the plate surfaces and the closeness of the setting.

As an alternative to a second milling step, it is possible to homogenize the mixture of ingredients to obtain a smooth product. The primary benefit of a homogenizer is that it reduces all of the solids in the formulation to a more uniform size and to a volume as great as possible with conventional milling devices. Excellent results were obtained by employing homogenizing pressures of 5–6,000 psi. Homogenizing pressures in this range result in particle size for the product in the area of 4 to 5 mills. Similar results can be obtained with a conventional Urschell mill having for assembly heads No. 190–200 negative. Homogenization pressures as low as about 4,000 can be employed. Maximum pressures are largely determined by the design of the homogenizer and the product outlet temperature. Thus, homogenizers which are to operate in the 9–10,000 psi range can be utilized provided that the outlet temperature of the product does not exceed 180° F.

In a separate vessel, the sweetening agent is heated to a temperature of about 130°–140° F. Special effort must be utilized to insure that when the sweetening agent contains honey the temperature is not allowed to greatly exceed about 140° to minimize flavor loss from the honey. The sweetening agent is then added to the milled ingredients and uniformly mixed therewith. Preferably the milled ingredients have been cooled to about 150° F prior to the addition of the sweetening agent. The period of time for mixing is as short as necessary to insure the complete dispersion of the various ingredients to provide a homogeneous and smoothly textured composition. Depending upon the type of equipment employed, this can be a matter of seconds or many minutes.

Mixing can most advantageously be accomplished in a static in-line mixer. The static in-line mixer is essentially a length of pipe such as 2 feet long and one inch in diameter. In the inerior of the pipe are 12 bow-tie shaped elements whose length is parallel to that of the pipe. Each element makes a 180° twist and is welded to the elements before and after. The elements are welded together at 90° so that the material from one side of an element is split as it passes to the next. This procedure divides and re-divides the product as it travels the length of the in-line mixer.

Once the mixture has achieved the desired texture and homogeneity, it is then transferred, conveniently by means of a pump, into the containers, while maintaining the mixture at a temperature of at least about 85° F. and not more than about 125° F., more usually in the range of about 90° to 115° F. It is found that the particular temperature in which the containers are filled is frequently a function of the stabilizer which is employed.

Various swept surface heat exchanging equipment may be used to provide the necessary cooling. A swept surface heat exchanger is essentially an industrialized ice cream freezer. Within an outside cylinder is a small cylinder or shaft that rotates. Onto this shaft are attached wiping blades 180° apart. The blades are parallel with the length of the cylinder and shaft. On the exterior of the cylinder, refrigeration is applied by means of ammonia, Freon or cold water. Heat is thus removed from the product traveling through the cavity of the cylinder. As the shaft rotates, the blades continually remove the cooled product from the cylinder walls and permit warm product to take its place. Illustrative equipment includes the Thermutator, supplied by Cherry Burrell, and Creamery Package's St. Regis version. Conventional equipment can be used for metering the various ingredients so as to insure the proper proportions.

In order to demonstrate the subject invention, a number of compositions were prepared in accordance with the subject process. All the ingredients with the exception of the sweetening agent were milled to the desired fineness by a Bauer disc-type mill.

The milled ingredients and honey composition were combined and the entire mixture agitated. The mixture was then fed to containers employing a heat exchanger feed pump, where the temperature was controlled by adjustment of the pump speed. The temperature was controlled in the range of 90° to 115° F, which was found to vary with the particular stabilizer employed.

The following compositions were prepared and found to have the desired taste, texture, stability and appearance:

|  | Weight % | | | |
|---|---|---|---|---|
|  | 1 | 2 | 3 | 4 |
| Peanuts - roasted and blanched | 81.5 | 71.0 | 81.5 | 71.0 |
| Cerelose, anhydrous | 4.0 | 4.0 | 4.0 | 4.0 |
| Salt | .8 | .8 | .8 | .8 |
| Emulsifier[1] | .25 | .5 | .25 | .5 |
| Stabilizer[2] | 1.7 | 1.7 | 1.7 | 1.7 |
| Vegetable Oil | 6.75[3] | 12.0[3] | 6.75[4] | 12.0[5] |
| Honey | 5.0 | 10.0 | 5.0 | 10.0 |
|  | 100.00 | 100.00 | 100.00 | 100.00 |

[1]Decaglycerol Tetraoleate
[2]Sta-nut M from Durkee
[3]Peanut Oil
[4]Cotton Seed Oil
[5]Soya Bean Oil Although the foregoing invention has been described in some detail by way of illustration and example for purposes of clarity of understanding, it is to be apparent to one skilled in the art that certain changes and modification may be practiced within the spirit of the invention.

What is claimed is:
1. A method for preparing a desirably appearing smoothly textured, storage stable, sweetened peanut butter composition having at least about 5 weight percent based on the total composition of honey, which comprises:
   combining roasted peanuts with a glyceride stabilizer and a small amount of at least one substantially anhydrous hydrophilic additive of the group consisting of mono- and disaccharides and salt, to form a peanut composition;
   milling said peanut composition with vegetable oil and from about 0.15 to 0.85 weight percent based on the weight of honey of an emulsifier;
   adjusting the temperature of the milled mixture to about 140°–150° F;
   heating said honey up to about 120°–140° F; and
   blending said heat adjusted mixture with said heated honey to form a smooth homogeneous sweetened butter composition,
   wherein said roasted peanuts and vegetable oil are in an amount of from about 60 to 92 weight percent, said stabilizer is in an amount of from about 1 to 3 weight percent, and said vegetable oil is in an amount of from 6 to 24 weight percent based on the final composition.

2. A method in accordance with claim 1, wherein said emulsifier is a solid added to said roasted peanuts prior to said milling.

3. A method in accordance with claim 1, wherein said emulsifier is a liquid added to said vegetable oil prior to said milling.

4. A method according to claim 1, wherein said milled peanut composition is combined with said honey at a temperature of below about 150° F.

5. A method according to claim 1, wherein said substantially anhydrous additives are a monosacchride and salt, said monosacchride being present in from about 2.5 to 5 weight percent based on the final composition, and said salt being present in from 0.2 to 2 weight percent based on the final composition.

6. A method according to claim 1, wherein from 0 to 20 weight percent of the peanuts present in said composition is present as chunk peanuts.

7. A method according to claim 1, wherein at least one of said mono- or disaccharides is a member of the group consisting of glucose and maltodextrin.

8. A method according to claim 1, wherein said substantially anhydrous additives have less than 5 weight percent water.

9. A method according to claim 1, including the steps of cooling said sweetened peanut butter composition to a temperature in the range from about 85°–125° F, and introducing said cooled sweetened peanut butter composition into containers.

10. A desirably appearing, smoothly textured, storage stable, sweetened peanut butter composition prepared according to the method of claim 1.

11. A method according to claim 1, wherein said emulsifier is a polyglycerol ester.

12. A method according to claim 11, wherein said polyglycerol ester is decaglycerol tetraoleate.

13. A method according to claim 1, wherein said saccharide is dextrose, said emulsifier is decaglycerol tetraoleate and said composition also containing from about 0.2 to 2 weight percent salt.

14. A composition prepared according to claim 12.

* * * * *